Dec. 4, 1962

B. R. LINDEN 3,067,329

NEUTRON DETECTOR

Filed March 12, 1959

INVENTOR.
BERNARD R. LINDEN

BY *Darby & Darby*

ATTORNEYS

3,067,329
NEUTRON DETECTOR

Bernard R. Linden, Norwalk, Conn., assignor, by mesne assignments, to Fairchild Camera and Instrument Corporation, Syosset, N.Y., a corporation of Delaware
Filed Mar. 12, 1959, Ser. No. 799,018
14 Claims. (Cl. 250—83.1)

This invention relates to a neutron detector which discriminates against gamma rays.

In the operation of nuclear reactors, other neutron sources, and similar equipment, the operator should know the neutron intensity in the surrouding environment. This knowledge is important for many reasons. Firstly, there is the personal danger. Secondly, since the neutron intensity is a measure of the power level of the reactor, or efficiency of the neutron source, it will show to what degree the reactor or source is under control. Unfortunately, neutrons are generally accompanied by gamma rays which are present in such large amounts that they make accurate determination of the neutron radiation level difficult, if not impossible.

Many systems have been devised to measure the neutron intensity while discriminating against the gamma rays, but most are either complex or unsatisfactory. One prior art neutron detector has a chamber wherein a gas becomes ionized. This type of detector is not entirely satisfactory because gamma rays are also effective in ionizing the gas.

Another neutron detector uses two scintillators, the solvent for one being more effective for neutrons than for gamma rays. The neutron density is obtained by subtracting the results. The necessary circuitry leads to complex apparatus.

Another type of neutron detector rotates disks which are selectively coated with neutron absorbent material. The mechanical arrangement makes this type of detector undesirable.

It is therefore the principal object of my invention to provide an improved neutron detector.

It is another object of my invention to provide a simple neutron detector which has negligible sensitivity to gamma rays.

Figure 1:
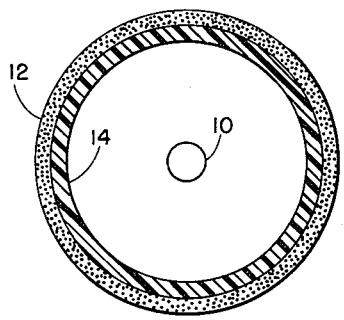
Figure 2:
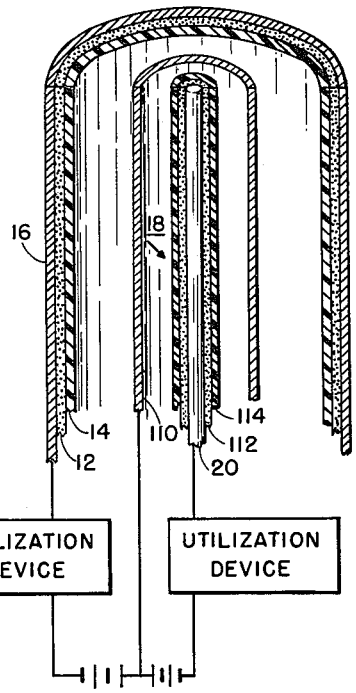

The attainment of these objects and others will be realized from the following specification, taken in conjunction with the drawings, of which, FIG. 1 is a cross sectional view illustrating the basic concept of my neutron detector; and FIG. 2 shows another embodiment thereof.

The basic concept of my neutron detector is to use a material which absorbs neutrons, but is not affected by gamma rays. When this material absorbs neutrons, it ejects particles to bombard a secondary emissive material, which thereupon frees electrons into an evacuated space. Tha electrons are then attracted to a collector, and suitable circuitry measures the electron flow and thus the neutron intensity.

FIG. 1 shows a material 12 which is a good absorber of neutrons but is insensitive to gamma rays. Many materials act in this way, boron, lithium, sulphur, and thorium being examples. When materials such as these absorb neutrons, their nuclei "explodes," ejecting charged nuclear particles which may be protons, alpha particles, lithium nuclei, electrons, or fission products depending upon the absorber. The ejected particles enter material 14, which is a secondary emitter, and cause the emission of many low-speed electrons. A secondary emissive material is chosen which has negligible absorption for neutrons and gamma rays. Suitable secondary emitters are $SiO_2$, $MgF_2$, and $MgO$. An electric field directs the low-speed electrons to collector electrode 10. The space between secondary emitter 14 and collector 10 is evacuated to facilitate the electron flow, which is measured by a utilization device.

While FIG. 1 shows my invention in cross section, the device may be spherical, cylindrical, or of any other desired shape. Thus, due to my invention, impinging neutrons are absorbed, and cause the emission of large numbers of electrons which are then detected.

FIG. 2 illustrates another embodiment of my invention, shown for convenience as concentric cylinders. In FIG. 2, layers 12 and 14 are the same as previously described, and cylinder 110 functions as the electron collector. Since my device is evacuated, a shell 16 is used for structural strength; this may be any material which is permeable to neutrons (aluminum is one satisfactory substance). Hermetical sealing end members may be required. To absorb more neutrons, a second concentric structure 18 is added. This comprises an inner support 20, a neutron absorber 112, and a secondary emitter 114. Thus, two neutron absorbers 12 and 112 are available, to cause bombardment of two secondary emitters 14 and 114. Collector 110 will attract electrons from either emitter.

Since neutrons of different energy ranges are best absorb by different materials, the absorbers and their thickness are selected for optimum operation.

Under some conditions it may be impractical to use a neutron absorber which is insensitive to gamma rays. This may occur, for example, if the neutron density is such that it requires a particular absorber, and this reacts to gamma rays. Alternatively, it may be desirable to completely exclude all effects due to gamma ray absorption. Either of these situations can be handled by modifying the FIG. 2 embodiment of my invention by making absorber 112 react to gamma rays, but not to neutrons. Material which will absorb gamma rays but not neutrons is well known and is set forth, for example, on pages 78, 86 and 87 of the textbook Principles of Nuclear Reactor Engineering by Samuel Glasstone, published by D. Van Nostrand & Co., July 1955. Examples of such material are lead and gold. In the presence of gamma rays and the absence of neutrons, the separate circuits are adjusted so that the electron flow due to gamma ray absorption by absorber 12 is exactly balanced by gamma ray absorption by absorber 112. When both neutron and gamma excitations are present, only the neutron intensity will be measured.

A problem generally arises in applying a signal from a remotely positioned detector to a utilization device. The connecting transmission line usually has a fixed characteristic impedance, and a matching coupling must be connected between the detector and the line. Due to the unusual structure of most prior art detectors, the matching coupling is quite complex. My invention inherently eliminates the need for a matching coupling. This arises from the fact that both the transmission line and my invention as shown in FIG. 2 comprise coaxial cylinders.

Since the actual dimensions of my device are not critical, the inner and outer diameters may be chosen to provide an impedance which matches the transmission line.

My neutron detector has many advantages. It is simple, compact, and requires no complex circuitry. Due to the passage of electrons through a vacuum, rather than a gas, the time resolution is good. This means that my device reacts quickly to sudden changes in neutron intensity, and has no dead time during which it is incapable of responding to excitation. My basic device has negligible sensitivity to gamma rays, and may be designed to compensate for them.

What is claimed is:

1. A neutron detector comprising: a neutron absorber;

a secondary emitter positioned contiguously with said absorber; an electron collector spaced from said emitter; a second neutron absorber; a second secondary emitter positioned contiguously with said second absorber; said second absorber and said second emitter positioned on opposite sides of said collector; an evacuated area between said emitters and said collector and means connected to said collecting means for measuring the current produced by electrons impinging upon said collector.

2. A neutron detector insensitive to gamma rays, comprising: means absorbing neutrons without absorbing gamma rays, and ejecting nuclear particles; means absorbing said particles and emitting electrons, said means comprising a secondary emitter positioned contiguously with said neutron absorbing means, second means absorbing neutrons without absorbing gamma rays and ejecting nuclear particles, second means absorbing said particles and emitting electrons, said second particle absorbing means comprising a secondary emitter positioned contiguously with said second neutron absorbing means; and an electron collector positioned between said emitters and separated from said emitters by an evacuated space.

3. The device of claim 2 including means directing said electrons from said emitters to said collector.

4. The device of claim 3 including means measuring the electron flow.

5. A neutron detector which can compensate for gamma radiation, comprising: a neutron absorber which is sensitive to gamma rays whereby either excitation produces nuclear particles; a secondary emitter positioned to absorb said particles whereby electrons are emitted; a gamma ray absorber which ejects nuclear particles when excited by gamma rays; a second secondary emitter positioned to absorb said particles from said gamma absorber whereby electrons are emitted; and an electron collector positioned in an evacuated space between said two secondary emitters.

6. The device of claim 5 including means directing said electrons to said collector.

7. The device of claim 5 including means directing said electrons to said collector and a utilization device.

8. A neutron detector which is insensitive to gamma rays, comprising: an electron collector; a circumjacent neutron absorber capable of absorbing neutrons but insensitive to gamma rays whereby when neutrons are absorbed, nuclear particles are emitted; a coating of secondary emissive material contiguously positioned on the surface of said absorbing material toward said collector whereby said particles cause said emissive material to liberate electrons which may be directed toward said collector, said collector and said emissive material being separated by an evacuated space.

9. A neutron detector, comprising: an evacuated envelope having a shell which is permeable to neutrons; a layer of material that absorbs neutrons but is insensitive to gamma rays positioned within said envelope whereby neutrons are absorbed to produce charged particles; a coating of secondary emissive material positioned contiguously on the inner surface of said neutron absorbing material whereby particles produced by said neutrons impinge on said secondary emissive material to liberate electrons; an electron collector positioned adjacent said secondary emissive material to collect liberated electrons; a second coating of secondary emissive material positioned on the other side of said collector; a second layer of absorbing mateiral positioned contiguously with said second secondary emissive material whereby said second neutron absorber produces nuclear particles that impinge on said secondary emissive material to liberate electrons which are collected by said collector.

10. The device of claim 9 wherein said second absorber absorbs neutrons, but is insensitive to gamma rays.

11. The device of claim 9 including means to direct electrons to said collector, and means to meausre the flow of said electrons.

12. The device of claim 9 wherein said second absorber absorbs gamma ray, but is insensitive to neutrons.

13. The device of claim 12 including means to direct electrons to said collector, and means to measure the flow of electrons from each said secondary emissive material.

14. The device of claim 9 wherein said absorbing material, said emissive material, and said collector are all coaxial cylinders.

References Cited in the file of this patent

UNITED STATES PATENTS

| | | |
|---|---|---|
| 2,272,375 | Kallman et al. | Feb. 10, 1942 |
| 2,305,452 | Kallman et al. | Dec. 15, 1942 |
| 2,767,324 | Van de Graaff | Oct. 16, 1956 |
| 2,991,363 | Rosenthal | July 4, 1961 |
| 2,994,773 | Sternglass | Aug. 1, 1961 |